US008345646B2

(12) United States Patent
Andrus et al.

(10) Patent No.: US 8,345,646 B2
(45) Date of Patent: Jan. 1, 2013

(54) ACCESS TERMINAL CONDITIONALLY OPENING A DATA SESSION

(75) Inventors: Don Nielsen Andrus, Carlsbad, CA (US); James A. Hutchison, San Diego, CA (US); Rotem Cooper, San Diego, CA (US); Vikas Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 910 days.

(21) Appl. No.: 11/502,216

(22) Filed: Aug. 9, 2006

(65) Prior Publication Data

US 2008/0037500 A1    Feb. 14, 2008

(51) Int. Cl.
*H04W 72/00*    (2009.01)
*H04W 4/00*    (2009.01)

(52) U.S. Cl. .................... 370/338; 455/450; 455/435.1; 370/329

(58) Field of Classification Search .......... 455/450–453, 455/435.1–444; 370/352, 320, 331, 329, 370/330
See application file for complete search history.

(56) References Cited

U.S. PATENT DOCUMENTS

| | | | |
|---|---|---|---|
| 6,501,746 B1 * | 12/2002 | Leung | 370/338 |
| 6,741,576 B1 | 5/2004 | Alimi et al. | |
| 2003/0135626 A1 | 7/2003 | Ray et al. | |
| 2003/0223393 A1 * | 12/2003 | Lee | 370/335 |
| 2005/0030947 A1 | 2/2005 | Alfano et al. | |
| 2005/0044194 A1 | 2/2005 | Baldiga et al. | |
| 2005/0207368 A1 * | 9/2005 | Nam | 370/320 |
| 2005/0237977 A1 * | 10/2005 | Sayeedi | 370/331 |
| 2006/0031368 A1 * | 2/2006 | deCone | 709/207 |
| 2006/0140143 A1 | 6/2006 | Bauer | |
| 2007/0153769 A1 * | 7/2007 | Comstock et al. | 370/352 |

FOREIGN PATENT DOCUMENTS

| | | |
|---|---|---|
| EP | 0967825 | 12/1999 |
| JP | 2000183921 A | 6/2000 |
| WO | 03009871 | 8/2003 |
| WO | 2004114590 | 12/2004 |

OTHER PUBLICATIONS

Interoperability Specification (IOS) for High Rate Packet Data (HRPD) Access Network Interfaces—Rev A. (3GPP2 A.S0007-Av2. 0), published in May 2003, p. 3-19 and p. A-39.*
TIA/EIA Interim Standard Data Service Options for Wideband Spread Spectrum Systems, TIA/EIA/IS-707-A, dated Apr. 1999, TIA/EIA/IS-707-A.5, p. 2-4.*
TIA/EIA Interim Standard Data Service Options for Wideband Spread Spectrum Systems, TIA/EIA/IS-707-A, dated Apr. 1999.*
International Search Report—PCT/US07/075156, International Search Authority—European Patent Office—May 2, 2008.
Written Opinion—PCT/US07/075156, International Search Authority—European Patent Office—May 2, 2008.
Taiwan Search Report—TW096129403—TIPO—Mar. 1, 2012.

* cited by examiner

*Primary Examiner* — Lester Kincaid
*Assistant Examiner* — Daniel Lai
(74) *Attorney, Agent, or Firm* — Kevin T. Cheatham

(57) ABSTRACT

The access terminal is configured to wirelessly send to a data system a request that the data system assign an access terminal identifier (ATI) to the access terminal. The access terminal delays transmission of the request until after a user of the access terminal has employed the access terminal to request a packet data service from the data system. In some instances, the data system is an Evolution, Data Only (EV-DO) system and the access terminal identifier (ATI) is a Unicast Access Terminal Identifier (UATI) generated by the Evolution, Data Only (EV-DO) system.

19 Claims, 4 Drawing Sheets

ACCESS TERMINAL CONDITIONALLY OPENING A DATA SESSION

BACKGROUND

1. Field

The present invention relates to communications systems and more particularly to access terminals for use with data systems.

2. Background

The "Evolution, Data Only" or "Evolution, Data Optimized" (EVDO) system officially named in the Telecommunication Industry Association's "CDMA2000, High Rate Packet Data Air Interface Specification" is an example of a data system. Access terminals used to access an EVDO system typically open an EVDO session upon acquiring the EVDO system. The EVDO system stores data for each open session. Since a large number of sessions may be open at one time and a large portion of the open data sessions are never used, the EVDO system often must unnecessarily store a large amount of data. There is a need to reduce the data storage requirements of EVDO systems.

SUMMARY

An access terminal is configured to delay opening a data session until after a user of the access terminal has employed the access terminal to request a packet data service from a data system. Opening the data session can include requesting an Access Terminal Identifier (ATI) from the data system. In some instances, the data system is an Evolution, Data Only (EV-DO) system and the access terminal identifier (ATI) is a Unicast Access Terminal Identifier (UATI) generated by the Evolution, Data Only (EV-DO) system.

Another embodiment of the access terminal is configured to open a data session on a data system. Opening the data session includes receiving from the data system an Access Terminal Identifier (ATI) that the data system assigned to the access terminal. The access terminal is also configured to establish a packet data connection over which the access terminal can receive packet data services from the data system. The access terminal is further configured to make a determination whether to close the data session such that data system can re-assign the Access Terminal Identifier (ATI) to another access terminal. The determination is at least partially dependent on a time since a user of the access terminal last requested one of the packet data services.

An embodiment of the access terminal includes electronics configured to wirelessly open an Evolution, Data Only (EV-DO) session on an Evolution, Data Only (EV-DO) system. Opening the Evolution, Data Only (EV-DO) session includes receiving a Unicast Access Terminal Identifier (UATI) from the Evolution, Data Only (EV-DO) system. The access terminal also includes electronics configured to delay opening the Data Only (EV-DO) session until after a user of the access terminal has employed the access terminal to request a packet data service from the Evolution, Data Only (EV-DO) system. The access terminal also includes electronics configured to make a determination whether to close the data session such that the data system can re-assign the Access Terminal Identifier (ATI) to another access terminal. The determination is at least partially dependent on a time since the user of the access terminal last requested a packet data service.

BRIEF DESCRIPTION OF THE DRAWINGS

FIG. 3 illustrates a method of operating an AT.

FIG. 4 is a logic flow diagram showing logic modules for operating an AT.

DETAILED DESCRIPTION

An access terminal (AT) is configured delay opening an EVDO data session until after a user of the access terminal uses the access terminal to request a packet data service from the EVDO system. In order for the AT to execute the request for the packet data service, the AT makes use of an open data session. As a result, the EVDO system does not open a session until the users has indicated an intent to actually use the open session. Accordingly, the EVDO system is not storing session data for sessions that will not be used and the data storage requirements of the EVDO system are reduced.

In some instances, an AT when determining whether to close an open EVDO session takes into account the time that has elapsed since the user last requested a packet data service. For instance, the AT can close an open EVDO session at least partially in response to the time since the user last requested a packet data service exceeding a time threshold. As a result, the AT closes the session after the user stops using the open session. Once the session is closed, the EVDO system stops storing data for the session. Accordingly, the EVDO system stops storing data for sessions that the user has stopped using and the data storage requirements of the EVDO system are reduced.

Figure 1:
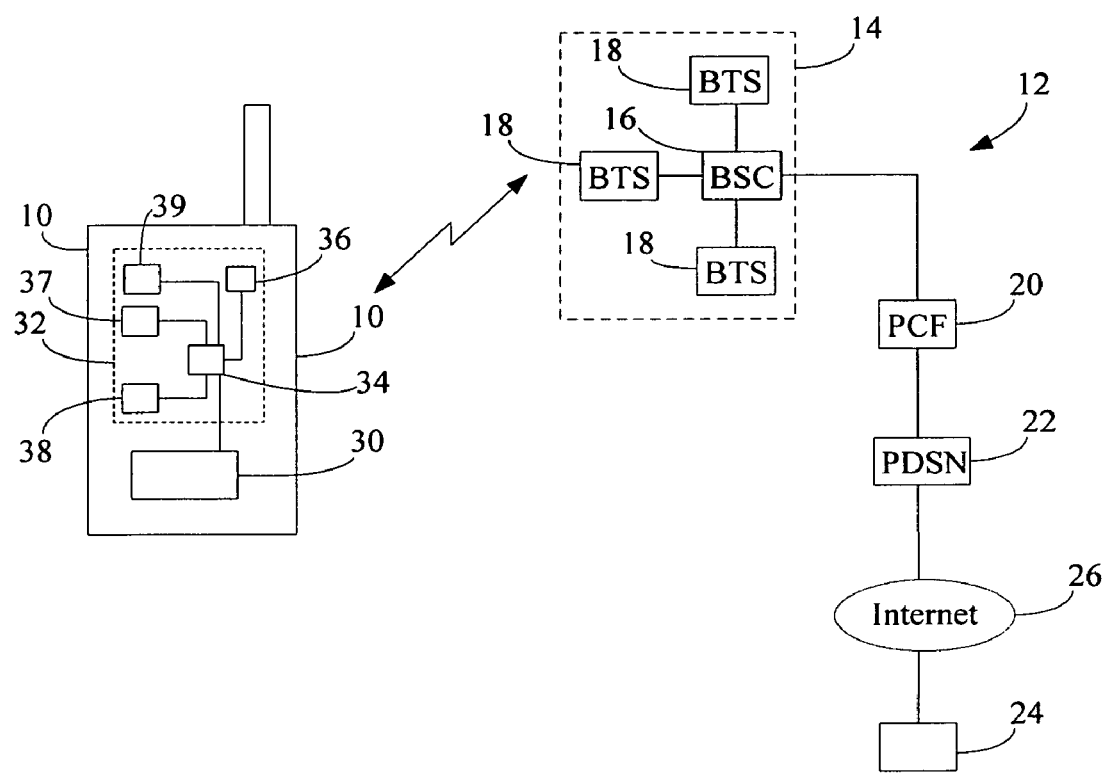
FIG. 1 illustrates an access terminal (AT) in communication with an EVDO system.

FIG. 1 illustrates an access terminal 10 in communication with an EVDO system 12. The EVDO system includes an access network (AN) 14 in communication with the access terminal 10. The access network 14 can be a CDMA2000 1x-EV-DO network. For instance, the access network 14 includes a Base Station Controller (BSC) 16 in communication with a plurality of access points such as base transceiver stations (BTS) 18. The AT preferably communicates with the AN over a wireless air-link. The communication between the AT the AN need not be over a wireless air-link and can employ other links such as wires, optical fibers and/or waveguides.

A Packet Control Function (PCF) 20 is in communication with the AN 14 and with a Packet Data Serving Node (PDSN) 22. The PCF 20 manages the relay of packets of data between the AN 14 and the PDSN 22. In some instances, the PCF 20 is included in the BSC 16 and is accordingly included in the AN 14. The PCF 20 and BSC 16 can exchange signaling information on a CDMA2000 1x-EV-DO A9 interface. The PCF 20 and BSC 16 can exchange user traffic on an A8 connection using a CDMA2000 1x-EV-DO A8 interface. The PCF 20 and PDSN 22 can exchange signaling information on a CDMA2000 1x-EV-DO A11 interface. The PCF 20 and PDSN 22 can exchange user traffic on an A10 connection using a CDMA2000 1x-EV-DO A10 interface. The PDSN can communicate with an end-point 24 through the Internet 26. The end-point can be the source of a download or a multicast received at the AT and/or the end-point can be a destination for an upload from the AT. A suitable end point includes, but is not limited to, servers and computers such as PCs.

The AT 10 includes one or more user interfaces 30. Suitable user interfaces 30 include, but are not limited to, buttons, knobs, keys, keypads, keyboards, a mouse, and displays such as an LED displays. A user of the AT can employ one or more of these user interfaces 30 to request packet data services from the EVDO system 12. Examples of packet data services include, but are not limited to, data services such as Internet access, high-rate broadband data, and/or streaming media and multicast services such as broadcast multicast services (BC-MCS).

The AT 10 includes electronics 32 in communication with the one or more user interfaces 30. The electronics 32 are configured to control the operation of the AT 10. For instance, a user can employ the one or more user interfaces 30 to generate one or more electrical signals that indicate a request for packet data services to the electronics. The electronics 32 are configured to execute the request. For instance, the electronics 32 send and receive messages to the AN in order to execute the request. In executing a request for packet data service, the electronics 32 can operate the AT in accordance with the Telecommunication Industry Association's "CDMA2000, High Rate Packet Data Air Interface Specification."

The electronics 32 include a processor 34 in communication with a transceiver 36. The processor 34 can employ the transceiver to send and/or receive messages to the AN 14. As an alternative to the transceiver 36, the electronics can be in communication with a receiver and a transmitter. A suitable processor 34 includes, but is not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions attributed to the electronics and/or the processor. A general purpose processor may be a microprocessor, but in the alternative, the processor may be any conventional processor, controller, microcontroller, or state machine. A processor 34 may also be implemented as a combination of computing devices, e.g., a combination of a DSP and a microprocessor, a plurality of microprocessors, one or more microprocessors in conjunction with a DSP core, or any other such configuration.

The electronics 32 include a memory 37 in communication with the processor 34. The electronics 32 can store data for communicating with the AN 14 and the EVDO system 12 in the memory 37. For instance, the electronics 32 can negotiate parameters for an EVDO session with the AN 14 and/or the EVDO system 12 and can store these parameters in the memory 37. The memory 37 can be any memory device or combination of memory devices suitable for read/write operations.

In some instances, the electronics 32 include a computer-readable medium 38 in communication with the processor 34. The computer-readable medium 38 can have a set of instructions to be executed by the processor 34. The processor 34 can execute the instructions such that the electronics perform desired functions such as executing a request for packet data service originated by the user. Although the computer-readable medium 38 is shown as being different from the memory, the computer-readable medium 38 can be the same as the memory 37. Suitable computer-readable media 38 include, but are not limited to, optical discs such as CDs, magnetic storage diskettes, Zip disks, magnetic tapes, RAMs, and ROMs.

The electronics include one or more timers 39 in communication with the processor 34. The one or more timers can be employed to track the time since one or more events occur during the operation of the AT. For instance, as will be disclosed in more detail below, a timer can be employed to measure the time since a user last used the AT to request a packet data service and/or a timer can be employed to measure the time since a point-to-point protocol (PPP) connection was established.

Suitable access terminals 10 include, but are not limited to, external radio modems, wireless personal computer memory card international association (PCMCIA) cards, embedded radio modules, and mobile telephones. External radio modems can plug into standard interfaces such as USB or Ethernet RJ-45 connectors. Accordingly, external radio modems can be employed to give devices with these connectors wireless data capability. PCMCIA cards can be inserted into portable communications devices such as laptops computers or personal digital assistants (PDAs) in order to provide these devices with wireless data capability. Radio modules can be embedded or integrated into devices such as cameras or portable computers.

Figure 2:
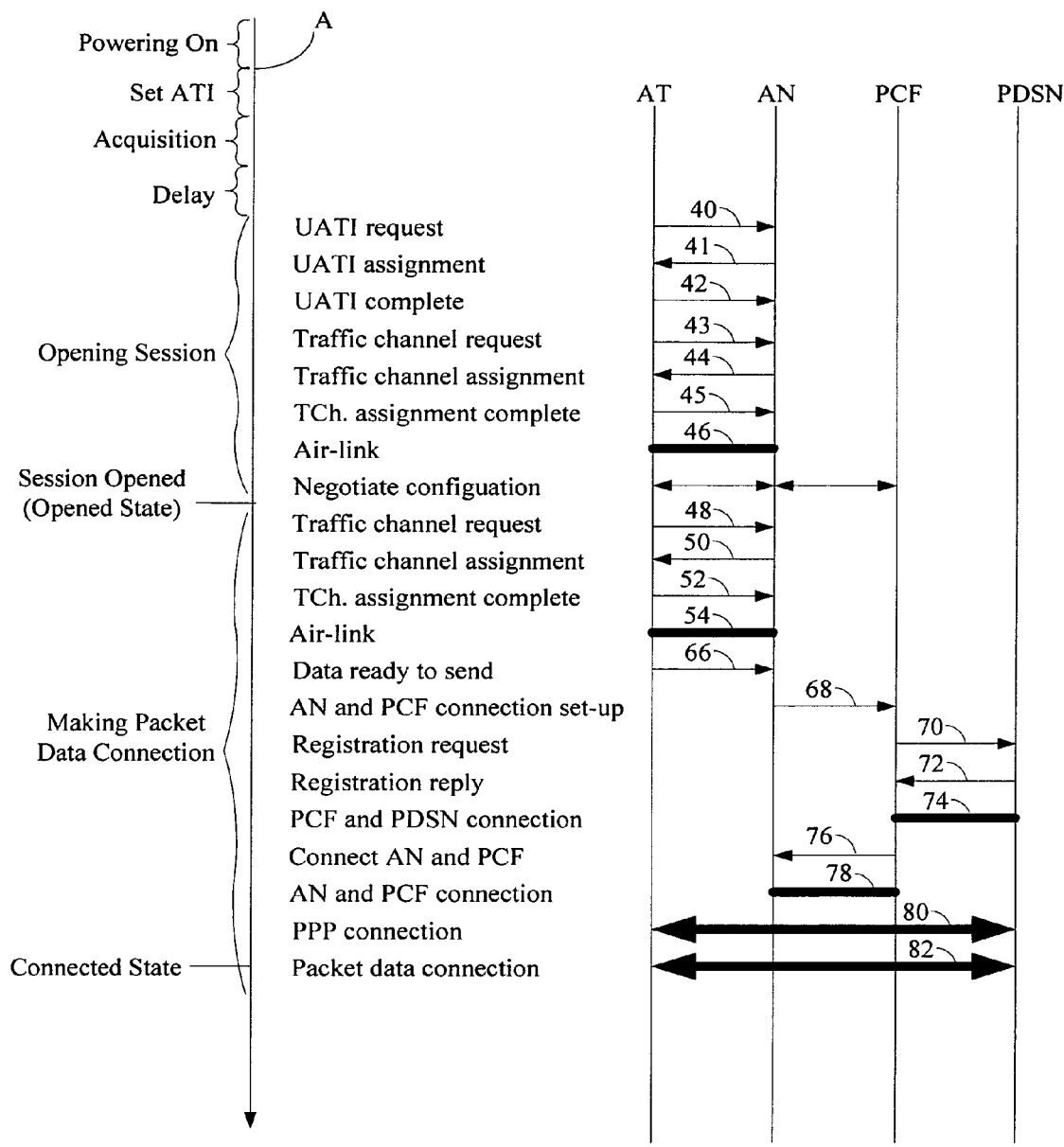
FIG. 2 illustrates the message exchanges that occur between an AT and the EVDO system after powering on the access terminal.

FIG. 2 illustrates the exchanges between the AT and the EVDO system after powering on the access terminal. The arrow labeled A illustrates the progression of time. The AT employs a unique identifier called an access terminal identifier (ATI). After the AT powers on, the electronics set the access terminal identifier (ATI) to a random access terminal identifier (RATI). The AT then enters an acquisition mode where the electronics look for a pilot channel tune the AT to a channel indicated by the pilot channel.

After the acquisition mode, the AT enters a delay mode. In the delay mode, the electronics wait until the user of the AT requests an exchange of packet data with the AN. For instance, the electronics wait until the user of the AT employs one or more user interfaces to request a packet data service. Once the user requests a packet data service, the electronics open a data session such as an EVDO session. Once the session is open, the AT can request a packet data connection from the EVDO system. To open the session, the electronics acquires a Unicast Access Terminal Identifier (UATI) from the AN. For instance, the electronics send a UATI request 40 to the AN. In response, the AN generates a UATI for the AT. The AN sends a UATI assignment message 41 to the AT. The UATI assignment message 41 includes the UATI requested by the AT. The electronics set the ATI for the AT to the UATI indicated in the UATI assignment message 41. The electronics send a UATI-complete message 42 to the AN. The UATI complete message 42 indicates to the EVDO system that the AT has successfully received the UATI. The EVDO system uses the UATI to track and identify the AT. Accordingly, the UATI is different for each AT with a session open on the EVDO system. However, the AN may change the UATI for the AT when the AT crosses a sub-net boundary. As a result, the UATI is generally assigned to the AT for the sub-net that the AT is monitoring.

The AT continues opening a session by establishing an air-link with the AN. The electronics send a traffic channel request 43 to the AN. If the AN has resources available, the AN will assign a forward traffic channel, a reverse power channel, and a reverse traffic channel to the AT. The AN will send a traffic channel assignment message 44 to the AT. The traffic channel assignment message indicates the traffic channels assigned to the AT. The electronics send a traffic channel assignment complete 45 message to the AN. The traffic channel assignment complete message 45 indicates to the AN that the AT has successfully received the assigned traffic channels. An air-link 46 now exists between the AT and the AN.

The AT continues opening the session by using the air-link to negotiate the session parameters with the AN. For instance, the AT can send a configuration request message to the AN. The AN can respond with the requested session parameters. The AT can respond with a configuration complete message that indicates to the EVDO system that the AT has successfully received the session parameters from the AN. The AN can then send a configuration request message to the AT. The AT can respond with the requested session parameters. The AN can respond with a configuration complete message that indicates to the AT that the AN has successfully received the session parameters from the AT. Session parameters include protocol configurations, configuration settings, and options for the session. An example of a negotiated parameter is Keep Alive data that determines the duration of a session once the session is opened. Additional examples of negotiated parameters include, but are not limited to, radio link protocol (RLP), point-to-point protocol (PPP), authentication parameters, the Default Packet Application, and/or stream configurations. The session is now open and the EVDO system is storing the UATI for the AT as well as all or a portion of the negotiated parameters.

In some instances, the process of opening the session includes authenticating the AT before permitting the AT access to the AN.

Once the AT and AN have agreed on a configuration, the AN sends a connection close and the air-link between the AT and the AN is closed. When the AT is ready to send data, the AT re-establishes the air-link using the negotiated parameters. For instance, the electronics send a traffic channel request 48 to the AN. The AN will assign a forward traffic channel, a reverse power channel, and a reverse traffic channel to the AT. The AN will send a traffic channel assignment message 50 to the AT. The traffic channel assignment message indicates the traffic channels assigned to the AT. The electronics send a traffic channel assignment complete 52 message to the AN. The traffic channel assignment complete message 52 indicates to the AN that the AT has successfully received the assigned traffic channels. The air-link 54 now exists between the AT and the AN.

After re-establishing the air-link, the AT begins making a packet data connection. The AT initiates the packet data connection by setting up a connection between the PCF and the PDSN and a connection between the AN and the PCF. The electronics send a data ready to send message 66 to the AN. The data ready to send message 66 indicates that the AT is ready to exchange packet data over the packet data connection. After receiving the data ready to send message 66, the AN sends the PCF an AN and PCF connection set-up message 68 to set up a connection between the AN and the PCF. For instance, the AN can send the PCF an A9-Setup-A8 message using the A9 interface to set up an A8 connection associated with the AT. In response to the AN and PCF connection set-up message 68, the PCF looks for a connection between the PCF and the PDSN that is associated with the AT. When there is no connection between the PCF and a PDSN that is associated with the AT, the PCF selects a PDSN and sends a registration request 70 to the selected PDSN. The registration request 70 requests that a connection between the PCF and the PDSN be assigned to the AT. For instance, where there is no A10 connection assigned to the AT, the PCF selects a PDSN and uses the A11 interface to send the selected PDSN an A11 Registration Request in order to request that an A10 connection be assigned to the AT. In response to the registration request, the PDSN returns a registration reply 72 to the PCF. In response, the PCF and PDSN associate a connection between the PCF and the PDSN 74 with the AT. For instance, the PCF and PDSN can associate an A10 connection with the AT. If an A10 connection is associated with the AT before the registration request 70 is sent, the PCF refrains from selecting a PDSN and also from sending the registration request 70 to the PDSN.

The PCF sends a connect AN and PCF message 76 to the AN to assign a connection between the AN and PCF 78 to the AT. For instance, the PCF sends an A9-Connect A8 message to the AN to associate an A8 connection with the AT. In response to the connect AN and PCF message 76, the PCF and PDSN assign a connection between the AN and PCF 78 with the AT. A point-to-point protocol (PPP) connection 80 is then negotiated between the PDSN and the AT. At this point, the AT is connected and packet data can flow on the packet data connection 82. Accordingly, the AT has entered the connected state.

After packet data has been exchanged on the packet data connection, the electronics can enter a dormant state. In the dormant state, packet data connection is closed but the PPP connection and the A10 connection remain established. When the user requests a packet data service or receives a page while the AT is in the dormant state, the PPP connection and/or the A10 connection are used to re-establish the packet data connection. Future embodiments of the data system may not require a PPP connection. Accordingly, the PPP connection may be optional. Accordingly, the PPP connection may not be present when the electronics are in the dormant state.

Some time after opening a session, the session is closed by either the AT or by the AN. Upon closing the session, the AN no longer stores the UATI for the AT. As a result, closing the session causes the AT to surrender the UATI and the UATI can be re-assigned to another AT.

The AT can employ one or more criteria to determine when to close a session. For instance, the AT can compare one or more times against one or more thresholds. As an example, the electronics can employ a first timer that is re-set when the PPP connection is established. The electronics can compare the time since the PPP connection was established to a first threshold. The first threshold serves as a first criterion. The first criterion is passed when the time since the PPP connection was established is less than the first threshold and the first criterion is failed when the time since the PPP connection was established is more than the first threshold.

The electronics can also employ a second timer that is re-set when the user requests packet data services. The electronics can compare the time since the user requested a packet data service to a second threshold. The second threshold serves as a second criterion. The second criterion is passed when the time since the user requested a packet data service is less than the second threshold and the criterion is failed when the time since the user requested a packet data service is more than the second threshold.

The time since a packet data service is requested can be determined from the point where the packet data service is originally requested or from the time where the request is completed. For instance, the AT can re-set the second timer when the request for packet data services is originally requested. Alternately, the AT can re-set the second timer when the request for packet data services is fully executed. An example of when a request for a packet data service is fully executed is when the AT stops receiving a multicast when a downloaded file is completely received at the AT.

In some instances, the electronics close the session when the first criterion or the second criterion is failed. In some instances, the electronics close the session when the first criterion and the second criterion are failed. Future EVDO systems may not employ a PPP connection. Accordingly, the electronics may employ only the second criterion and can close the session when the second criterion is failed.

The AT can close a session actively or passively. The AT can actively close a session by an sending a message to the AN to close the session. In response, the AN sends the AT a message to close the session, and the session is closed. For instance, the AT can send a CloseSession message to the AN, the AN responds with a CloseSession message, and the session will be closed. The AT can passively close a session by allowing the session to time out. As disclosed above, when the AT is opening a session, the AT negotiates keep alive data with the AN. The keep alive data determines the duration of an open session. For instance, when the session is being opened, the AN sets a keep alive timer. The electronics send a KeepAlive message to the AN at different times. If the AN receives the KeepAlive message before a keep alive threshold, the AN re-sets the keep alive timer and the session remains open. Accordingly, the EVDO system continues to store the UATI and other parameters for the AT. If the AN does not receive the KeepAlive message before the keep alive timer reaches the keep alive threshold, the AN closes the session. The AN can close a session by sending a message to the AT to close the session. In response, the AT sends the AN a message to close the session, and the session is closed. For instance, the AN can send a CloseSession message to the AT, the AT responds with a CloseSession message, and the session is closed. Accordingly, the electronics can close a session by refraining from sending a KeepAlive message within the designated time and thus allowing the session to time out. When the AT closes the session, the EVDO system can re-assign the UATI to another access terminal. As a result, the AT surrenders the UATI when the AT closes the session.

The AT can optionally send and/or receive messages in addition to the message illustrated in FIG. 2. For instance, between receiving the traffic channel assignment message and sending the traffic channel complete message, the AT can send the AN an ACAck message and/or receive an RTCAck from the AN. The ACAck message can tell the AT to stop sending access probes. The RTCAck message can tell the AT that the AN has acquired its reverse pilot.

Figure 3:
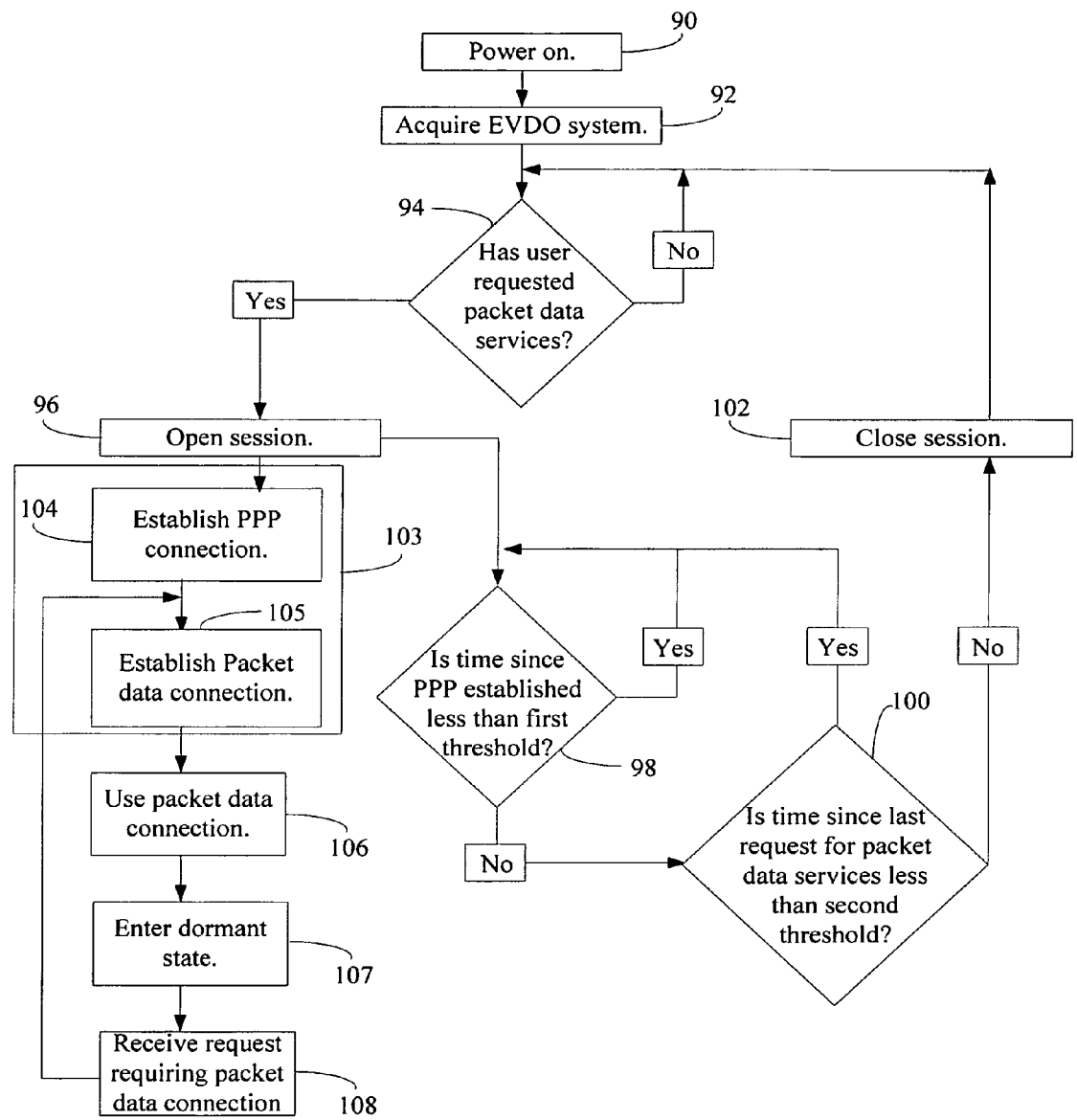

FIG. 3 illustrates a method of operating the AT. The electronics can execute a method according to FIG. 3. The electronics power on the AT at process block 90. At process block 92, the electronics acquire the EVDO system. At decision block 94, the electronics make a determination whether the user has requested packet data services. In the event that the determination is negative, the electronics return to decision block 74. When the determination is positive, the electronics open a session at process block 96. At decision block 98, the electronics make a determination whether the time since the PPP connection has been established exceeds a first threshold. If the determination is negative, the electronics permit the packet data connection to remain open and returns to decision block 98. When the determination is positive, the electronics proceed to determination block 100. At determination block 100, the electronics determine whether the time since the user has requested a pack data service exceeds a second threshold. For instance, the electronics can determine whether the time since the user has requested a multicast service or a data service exceeds the second threshold. When the determination is negative, the electronics permit the packet data connection to remain open and returns to decision block 98. When the determination is positive, the electronics close the session at process block 102. Accordingly, the electronics close the session when the time since the PPP was established is more than a first threshold and the time since the last request for packet data services is more than a second threshold.

From process block 96, the electronics make a packet data connection at process block 103. Making the packet data connection can include establishing a PPP connection at process block 104 and then establishing the packet data connection at process block 105. At process block 106, the electronics employ the pack data connection to exchange packet data with the EVDO system. After packet data has been exchanged on the packet data connection, the electronics enter the dormant state at process block 107. The electronics remain in the dormant state until the electronics receive a request that requires a packet data connection at process block 108. Examples of requests that requires a packet data connection include, but are not limited to, receiving a page from the EVDO system or the user of the AT requesting a packet data service. Once the electronics receive a requests that requires the packet data connection, the electronics re-establish the packet data connection at process block 105.

The electronics make a packet data connection at process block 98. Once the packet data connection is open, the electronics can employ the packet data connection to execute the request for data services. The AT need not go dormant between opening the session and making the packet data connection since the user has already requested a packet data service.

As noted above, future embodiments of the data system may not require a PPP connection. In these instances, the electronics may proceed directly from process block 96 to decision block 100. Accordingly, decision block 96 is optional.

Figure 4:
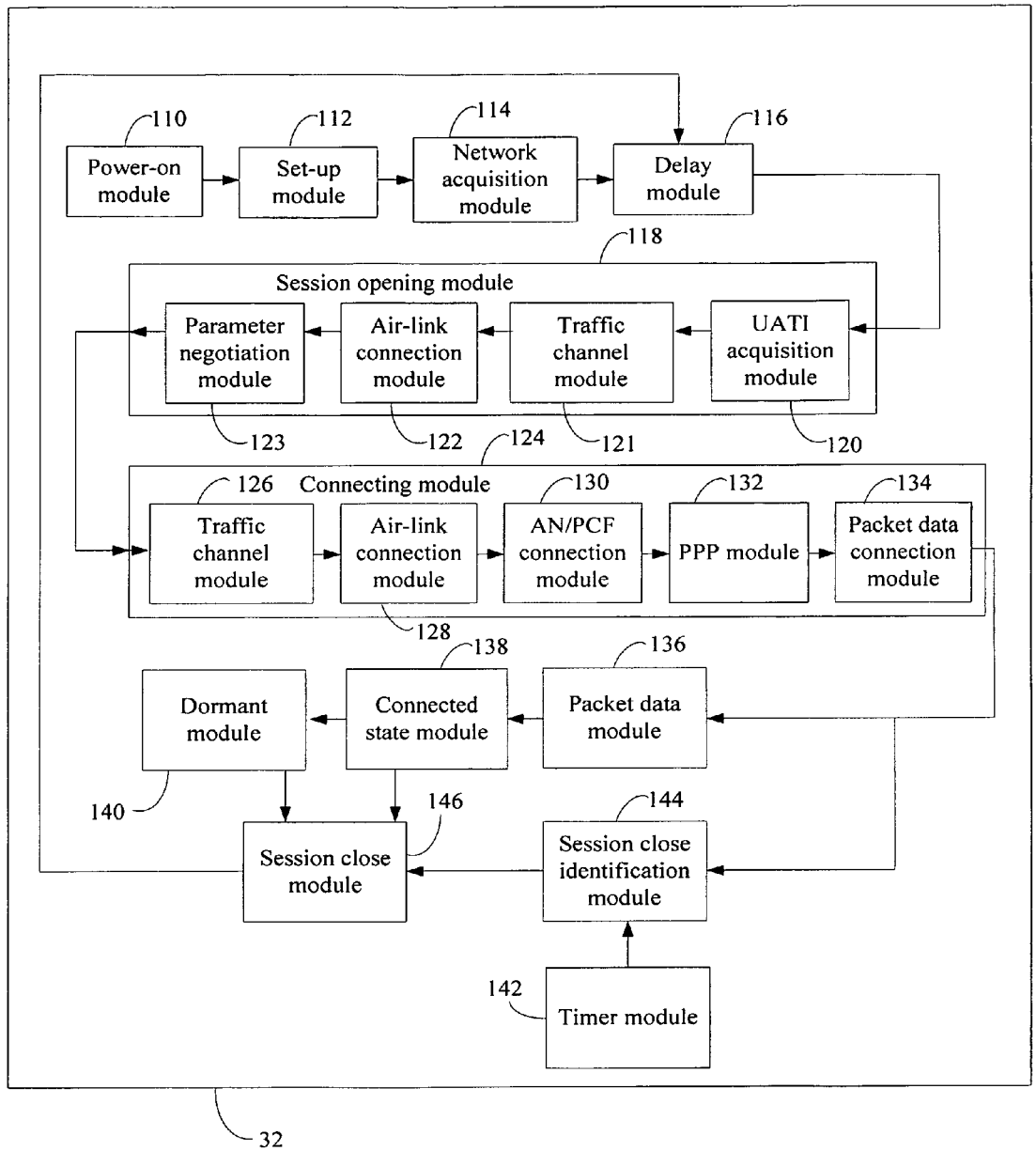

FIG. 4 is a logic flow diagram showing logic modules for operating an AT. The electronics 32 include a power-on module 110 that powers the module on. The electronics 32 also include a set-up module 112 that prepares the AT to open a session. For instance, the set-up module 112 sets the ATI for the AT to an RATI. The electronics 32 also include an acquisition module 114 that acquires the AN. The electronics 32 also include a delay module 116 that delays opening a session until the user request a packet data service. For instance, the delay 116 module can identify when the user has requested a packet data service and then provide a signal indicating that the session is to be opened.

The electronics 32 include a session opening module 118 that opens the session. Once the session is open, the AT can request a packet data connection from the AN. The session opening module includes a UATI acquisition module 120 that requests and acquires a UATI from the AN. The session opening module 118 includes a traffic channel module 121. The traffic channel module 121 requests and receives a traffic channel assignment from the EVDO system. The session opening module 120 also includes an air-link connection module 122 that sets up an air-link between the AT and the AN. The session opening module 120 also includes a parameter negotiation module 123. The parameter negotiation module 123 negotiates the parameters for the session with the EVDO system.

The electronics 32 also include a connecting module 124. The connecting module 124 causes the packet data connection to be established. The connecting module 124 includes a traffic channel module 126. The traffic channel module 126 requests and receives a traffic channel assignment from the EVDO system. The traffic channel module 126 can be the same as the traffic channel module 121 or different from the traffic channel module 121. The connecting module 124 also includes an air-link connection module 128 that sets up an air-link between the AT and the AN. The air-link connection module 128 can be the same as the air-link connection module 122 or different from the air-link connection module 122. The connecting module 124 also includes AN/PCF connection module 130. The AN/PCF connection module 130 causes the EVDO system to set up a connection between the AN and the PCF and assign the connection to the AT. For instance, the AN/PCF connection module 130 can causes the EVDO system to assign an A8 connection to the AT. In the event that a connection between the PCF and a PDSN is not assigned to the AT, the AN/PCF connection module 130 can also cause the EVDO system to set up a connection between the PCF and a PDSN and assign the connection to the AT. For instance, the AN/PCF connection module 130 can causes the EVDO system to assign an A10 connection to the AT. The connecting module 124 also includes a PPP module 132 for establishing the PPP connection. As noted above, future embodiments of the data system may not require a PPP connection. Accordingly, the PPP module 132 is optional. The connecting module 124 also includes a packet data connection module 134 for establishing the packet data connection.

The electronics 32 include a packet data module 136 for exchanging data on the packet data connection. The electronics 32 also include a connected state module 138 for operating the AT in the connected state when the AT is not exchanging packet data on the packet data connection. For instance, the connected state module operates the AT while the packet data connection is in place but not being actively used by the AT. The electronics 32 also include a dormant module 140 for putting the AT into the dormant state.

The electronics 32 also include a timer module 142. The timer module tracks the time since one or more events have occurred. For instance, the timer module can track the time since the PPP connection was established and/or the time since the user last requested a packet data service.

The electronics 32 also include a session close identification module 144 that identifies whether the session is to be closed. For instance, the AT can identify whether the session is to be closed by comparing one or more times received from the timer module 142 against one or more thresholds to determine whether the session should be closed. As an example, the electronics can compare the time since the PPP connection was established to a first threshold. The electronics can also compare the time since the user requested a packet data service to a second threshold. In some instances, the electronics identify that the session should be closed when the time since the PPP was established is more than a first threshold and the time since the last request for packet data services is more than a second threshold. As noted above, future embodiments of the data system may not require a PPP connection. In these instances, the electronics identify that the session should be closed when the time since the last request for packet data services is more than a second threshold. The electronics 32 can identify whether the session is to be closed while the AT is in the connected state or while the AT is in the dormant state. For instance, the electronics 32 can execute the session close identification module 144, in whole or in part, while the packet data module 136, and/or the connected state module 138 and/or the dormant module 140 is executed.

The electronics 32 also include a session close module 146 that closes the session. For instance, when the session close identification module 144 identifies that the session is to be closed, the session close module 146 can close the session. The session close module 146 can close the session while the AT is in the connected state or while the AT is in the dormant state. For instance, the electronics 32 can execute the session close module 146, in whole or in part, while the dormant module 140 and/or the connected state module 138 is executed.

In some instances, the module illustrated in FIG. 4 can be executed in a sequence other than the illustrated sequence. Additionally, one or more of the modules may be optional.

Although the operation of the AT is disclosed in the context of a CDMA2000 1x-EV-DO network, the principles of AT operation disclosed above can be employed in conjunction with other data networks and with other data systems. For instance, the principles of the AT operation disclosed above can be employed in conjunction with a CDMA2000 1x network or a CDMA2000 1x system.

Although the EVDO system is disclosed in the context of the PCF being outside of the AN, the PCF can be included in the BSC and can accordingly be included in the AN. As a result, in some instances, functions attributed to the AN are performed by a PCF included in the AN.

All or a portion of one or more methods described above can be executed by the access terminal, by the electronics in the access terminal, and/or by the data system. Further, the processor can cause the electronics and/or the AT to execute all or a portion of one or more of the above methods. When the electronics include a computer-readable medium, the processor can execute the instructions on the computer-readable medium. The instructions can cause the processor and/or the AT to execute all or the portion of one or more methods disclosed above. Additionally, all or a portion of one or more of the above methods can be executed by systems and devices other than the disclosed AT and data system.

Those of skill in the art would understand that information and signals may be represented using any of a variety of different technologies and techniques. For example, data and instructions that may be referenced throughout the above description may be represented by voltages, currents, electromagnetic waves, magnetic fields or particles, optical fields or particles, or any combination thereof.

Those of skill would further appreciate that the various illustrative logical blocks, circuits, and method steps described in connection with the embodiments disclosed herein may be implemented as electronic hardware, computer software, or combinations of both. To clearly illustrate this interchangeability of hardware and software, various illustrative components, blocks, logic, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, logic, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer-readable medium known in the art. An exemplary storage computer-readable medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An access terminal, comprising:
  electronics configured to perform signal acquisition from a data system upon initial power up of the access terminal;
  electronics configured to delay, after initial power up, transmission of a request to the data system to assign an access terminal identifier (ATI) to the access terminal until after a user of the access terminal has employed the access terminal to request a packet data service from the data system;
  electronics configured to wirelessly send to the data system the ATI assignment request only after a user of the access terminal has employed the access terminal to request the packet data service from the data system;
  electronics configured to open a data session on the data system, opening the data session including receiving from the data system an ATI assigned to the access terminal by the data system;
  electronics configured to establish a packet data connection over which the access terminal can receive packet data services from the data system;
  electronics configured to re-set a timer each time that a data transfer over the packet data connection that is initiated by a request for any of the packet data services is completed; and
  electronics configured to make a determination whether to close the data session based at least partially on a time specified by the timer;
  wherein the electronics configured to delay transmission of the request delay delays a data session until the user of the access terminal has employed the access terminal to request the packet data service from the data system,
  the access terminal being configured not to establish a packet data connection with the data system until the data session is opened,
  wherein opening the data session includes sending the request to the data system;
  establishing the packet data connection includes establishing a Point to Point Protocol (PPP) connection between the access terminal and an entity in the data system, and
  wherein the electronics configured to make the determination whether to close the data session determines to close the data session
    in response to a time since the Point to Point Protocol (PPP) connection being established exceeding a first threshold and
    also in response to the time specified by the timer exceeding a threshold.

2. The access terminal of claim 1, wherein one of the packet data services is an Internet access.

3. The access terminal of claim 1, wherein one of the packet data services is a multicast service.

4. The access terminal of claim 1, wherein the access terminal identifier (ATI) is a Unicast Access Terminal Identifier (UATI).

5. The access terminal of claim 1, wherein the access terminal identifier is surrendered by the access terminal if the data session is closed.

6. The access terminal of claim 1, the electronics configured to send a message to actively close the data session if it is determined that the data session is to be closed.

7. An access terminal, comprising:
  means for performing signal acquisition from a data system upon initial power up of the access terminal;
  means for delaying, after initial power up, transmission of a request to the data system to assign an access terminal identifier (ATI) to the access terminal until after a user of the access terminal has employed the access terminal to request a packet data service from the data system;
  means for wirelessly sending to the data system the ATI assignment request only after a user of the access terminal has employed the access terminal to request the packet data service from the data system;
  means for opening a data session on a data system, opening the data session including receiving from the data system an ATI assigned to the access terminal by the data system;
  means for establishing a packet data connection over which the access terminal can receive packet data services from the data system;
  means for resetting a timer each time a data transfer over the packet data connection that is initiated by a request for any of the packet data services is completed; and
  means for making a determination whether to close the data session such that the data system can re-assign the ATI to another access terminal, the determination being at least partially dependent on a time specified by the timer;
  wherein the means for delaying transmission of the request delays a data session until the user of the access terminal has employed the access terminal to request the packet data service from the data system,
  the access terminal being configured not to establish a packet data connection with the data system until the data session is opened,
  wherein the means for opening the data session includes sending the request to the data system;
  establishing the means for establishing the packet data connection includes establishing a Point to Point Protocol (PPP) connection between the access terminal and an entity in the data system, and
  wherein the means for making a determination whether to close the data session determines to close the data session
    in response to a time since the Point to Point Protocol (PPP) connection being established exceeding a first threshold and
    also in response to the time specified by the timer exceeding a threshold.

8. The access terminal of claim 7, wherein the data system is an Evolution, Data Only (EV-DO) system and the access terminal identifier (ATI) is a Unicast Access Terminal Identifier (UATI) generated by the Evolution, Data Only (EV-DO) system.

9. A method of operating an access terminal, comprising:
  performing signal acquisition from a data system upon initial power up of the access terminal;
  delaying, after initial power up, transmission of a request to the data system to assign an access terminal identifier (ATI) to the access terminal until after a user of the access terminal has employed the access terminal to request a packet data service from the data system;

wirelessly sending to the data system the ATI assignment request only after a user of the access terminal has employed the access terminal to request the packet data service from the data system;

opening a data session on a data system, opening the data session including receiving from the data system an ATI assigned to the access terminal by the data system;

establishing a packet data connection over which the access terminal can receive packet data services from the data system;

resetting a timer each time a data transfer over the packet data connection that is initiated by a request for any of the packet data services is completed; and making a determination whether to close the data session such that data system can re-assign the ATI to another access terminal, the determination being at least partially dependent on a time specified by the timer wherein the delaying transmission of the request comprises delaying a data session until the user of the access terminal has employed the access terminal to request the packet data service from the data system, the access terminal being configured not to establish a packet data connection with the data system until the data session is opened, wherein opening the data session comprises sending the request to the data system;

establishing the packet data connection comprises establishing a Point to Point Protocol (PPP) connection between the access terminal and an entity in the data system, and wherein the making the determination whether to close the data session comprises determining to close the data session in response to a time since the Point to Point Protocol (PPP) connection being established exceeding a first threshold and also in response to the time specified by the timer exceeding a threshold.

10. The method of claim 9, wherein the data system is an Evolution, Data Only (EV-DO) system and the access terminal identifier (ATI) is a Unicast Access Terminal Identifier (UATI) generated by the Evolution, Data Only (EV-DO) system.

11. The method of claim 9, wherein delaying transmission of the request delays opening an Evolution, Data Only (EV-DO) session until the user of the access terminal has employed the access terminal to request the packet data service from the data system, opening the session includes negotiating session parameters with the data system, and the access terminal being configured not to establish a packet data connection until after the data session is opened.

12. The method of claim 9, wherein one of the packet data services is an Internet access.

13. The method of claim 9, wherein one of the packet data services is a multicast service.

14. The method of claim 9, wherein the data system is an Evolution, Data Only (EV-DO) system and the access terminal identifier (ATI) is a Unicast Access Terminal Identifier (UATI) generated by the Evolution, Data Only (EV-DO) system.

15. The method of claim 9, wherein making the determination includes comparing the time specified by the timer to a threshold.

16. The method of claim 9, wherein establishing the packet data connection includes establishing a Point to Point Protocol (PPP) connection between the access terminal and an entity in the data system, and wherein the determination is at least partially also dependent on a time since the Point to Point Protocol (PPP) connection was established.

17. The method of claim 9, wherein establishing the packet data connection includes establishing a Point to Point Protocol (PPP) connection between the access terminal and an entity in the data system, and making the determination includes comparing a time since the Point to Point Protocol (PPP) connection was established to a threshold.

18. The method of claim 9, wherein establishing the packet data connection includes establishing a Point to Point Protocol (PPP) connection between the access terminal and an entity in the data system, and making the determination includes comparing a time since the Point to Point Protocol (PPP) connection was established to a first threshold, and comparing the time specified by the timer to a second threshold.

19. A non-transitory computer-readable medium having a set of computer-executable instructions stored thereon, the set of instructions causing a processor when executing the instructions to perform a procedure comprising:

performing signal acquisition from a data system upon initial power up of the access terminal;

delaying, after initial power up, transmission of a request to the data system to assign an access terminal identifier (ATI) to the access terminal until after a user of the access terminal has employed the access terminal to request a packet data service from the data system;

wirelessly sending to the data system the ATI assignment request only after a user of the access terminal has employed the access terminal to request the packet data service from the data system;

opening a data session on a data system, opening the data session including receiving from the data system an ATI assigned to the access terminal by the data system;

establishing a packet data connection over which the access terminal can receive packet data services from the data system;

resetting a timer each time a data transfer over the packet data connection that is initiated by a request for any of the packet data services is completed; and making a determination whether to close the data session such that data system can re-assign the ATI to another access terminal, the determination being at least partially dependent on a time specified by the timer wherein the delaying transmission of the request comprises delaying a data session until the user of the access terminal has employed the access terminal to request the packet data service from the data system, the access terminal being configured not to establish a packet data connection with the data system until the data session is opened, wherein opening the data session comprises sending the request to the data system;

establishing the packet data connection comprises establishing a Point to Point Protocol (PPP) connection between the access terminal and an entity in the data system, and wherein the making the determination whether to close the data session comprises determining to close the data session in response to a time since the Point to Point Protocol (PPP) connection being established exceeding a first threshold and also in response to the time specified by the timer exceeding a threshold.

* * * * *